United States Patent Office 3,480,635
Patented Nov. 25, 1969

3,480,635
N-PIPERIDYL SUBSTITUTED PHENYLENEDIAMINES
Elmar R. Altwicker, Somerville, N.J., assignor to Universal Oil Products Company, Des Plaines, Ill., a corporation of Delaware
No Drawing. Filed Sept. 28, 1966, Ser. No. 582,547
Int. Cl. C07d 29/10, 29/28
U.S. Cl. 260—293                 7 Claims

ABSTRACT OF THE DISCLOSURE

Novel N-piperidyl substituted phenylenediamines can be prepared by reductively alkylating a nitro or amino-substituted phenylamine with a piperidone. These compounds are useful as antiozonants and antioxidants.

---

This invention relates to a new class of compounds, to the preparational process therefor, and to compositions containing such compounds which are stabilized against deterioration caused by the action of ozone or oxygen. More particularly, this invention relates to N-piperidyl substituted phenylenediamines.

The novel compounds of this invention may be represented by the following general formula:

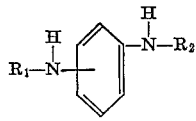

(I)

where $R_1$ is a piperidyl radical of the formula:

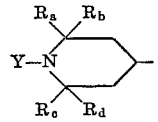

(II)

where Y is selected from the group consisting of hydrogen, alkyl, hydroxy, alkoxy, and an oxygen radical, and $R_a$, $R_b$, $R_c$ and $R_d$ are alkyl and where $R_2$ is selected from the group consisting of $R_1$, hydrogen, alkyl, cycloalkyl and aryl. The compounds having the above general formula find wide utility in the chemical field and are especially useful as ingredients of synthetic waxes or resins, precursors for pharmaceuticals or insecticides or as antiozonants and antioxidants. Of these many uses, however, one of the more valuable present uses for these compounds is the stabilization of compositions against the deteriorating effects of oxygen or ozone. Of significance in this respect is that certain of these compounds, and particularly the compounds where the $R_1$ piperidyl radical has Y as hydrogen and $R_a$, $R_b$, $R_c$ and $R_d$ as methyl, are effective in stabilizing rubbery polymers against ozone or oxygen attack.

Accordingly, an object of this invention is to provide a new class of compounds comprising N-piperidyl substituted phenylenediamines. Another objective is to provide compositions stabilized against deterioration resulting from the action of oxygen or ozone. These and other objects of this invention will be apparent from the following further detailed description thereof.

The compounds of this invention are prepared, in general, according to the process of this invention by reductively alkylating a nitro or amino substituted phenylamine of the formula:

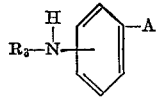

(III)

with a piperidone of the formula:

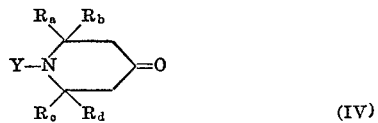

(IV)

where $R_3$ is selected from the group consisting of hydrogen, alkyl, cycloalkyl and aryl, A is selected from the group consisting of a nitro or amino group and Y, $R_a$, $R_b$, $R_c$ and $R_d$ have the same significance as indicated above. Examples of the nitro or amino substituted phenylamines represented by Formula III which may be used in the reaction include: where $R_3$ is hydrogen or an alkyl group and preferably alkyl of from 1 to about 20 carbon atoms, such phenlamines as p-nitrophenylamine, o-aminophenylamine, N-nonyl-p-aminophenylamine, N-octyl-p-aminophenylamine, N-butyl-p-aminophenylamine, N-dodecyl-o-aminophenylamine, N-pentadecyl-o-aminophenylamine, N-octadecyl-p-aminophenylamine, N-secbutyl-o-aminophenylamine or N-eicosyl-p-aminophenylamine; where $R_3$ is cycloalkyl and preferably cycloalkyl of from 5 to about 7 carbon atoms such phenylamines as N-cyclopentyl-p-nitrophenylamine, N-cyclopentyl-p-aminophenylamine, N-cyclohexyl-p-aminophenylamine, N-cyclohexyl-o-aminophenylamine, N-cycloheptyl-p-aminophenylamine, or N-cycloheptyl-o-aminophenylamine; or where $R_3$ is aryl, and preferably phenyl or naphthyl, such phenylamines as N-phenyl-p-aminophenylamine, N-(1-naphthyl)-p-aminophenylamine, N-phenyl-o-aminophenylamine or N-(2-naphthyl)-o-aminophenylamine. The above illustrated specific phenylamines represent only a few of the many phenylamines having the above Formula III which may be used to prepare the compounds of this invention. It should also be understood, of course, that the phenylamines may be substituted on the phenyl ring or on the $R_3$ group, when such is not hydrogen, with such groups as alkyl, halo, or alkoxy, examples of which include N-secoctyl-o-chloro-p-aminophenolamine, N-phenol-o-methoxy-p-aminophenylamine or N-(4-chlorobutyl-1)-p-nitrophenylamine.

The piperidone represented by Formula IV which may be reacted with the phenylamine of Formula III in the reductive alkylation reaction to prepare the compounds of this invention comprises a 2,2,6,6-tetraalkyl-4-piperidone wherein the $R_a$, $R_b$, $R_c$ and $R_d$ groups of Formula IV, independently of each other, are lower alkyl of preferably 1 to about 5 carbon atoms. These piperidones may be obtained according to several different methods and one method involves condensing ketones such as a 1,1,5,5-tetraalkyl-1,4-pentadien-3-one, where the alkyl groups correspond to the $R_a$, $R_b$, $R_c$ and $R_d$ alkyl groups of the piperidone, with a substituted amine or ammonia. Use of ammonia in the condensation will result in the obtainment of piperidones where Y of Formula IV is hydrogen and the use of substituted amines will result in the obtainment of piperidones where Y may be alkyl, hydroxy or alkoxy. For example, when an alkylamine is used in the condensation, and preferably where the alkyl portion is from 1 to about 5 carbon atoms, a piperidone where Y is alkyl will be obtained; when a hydroxylamine is used, a piperidone where Y is hydroxy will be obtained; and when an alkoxyamine is used, and preferably where the alkyl portion is from 1 to about 5 carbon atoms, a piperidone will be obtained where Y is alkoxy. When a piperidone is desired where Y is an oxygen radical —O·, a piperidone having the Y substituent as hydroxy, prepared according to above condensation, may be oxidized to the desired 2,2,6,6-tetraalkyl-4-piperidone nitrogen oxide which also may be referred to as 2,2,6,6-tetraalkyl-4-oxo-piperidino-oxy. For purposes of convenience, when the Y group of the piperidone of Formula IV or the piperidyl radical of Formula II is an oxygen radical —O·, it will be referred to herein as oxy. Examples of the piperidones represented by Formula IV which may be used in the reaction with the above illustrated phenylamines of Formula III to prepare the compounds of this invention include 2,2,6,6-tetramethyl-4-piperidone,
2,2,6,6-tetraethyl-4-piperidone,
2,2,6,6-tetrapropyl-4-piperidone;
1-methyl-2,2,6,6-tetramethyl-4-piperidone,
1-ethyl-2,2,6,6-tetramethyl-4-piperidone;
1-propyl-2,2,6,6-tetramethyl-4-piperidone;
1-hydroxy-2,2,6,6-tetramethyl-4-piperidone,
1-hydroxy-2,2,6,6-tetraethyl-4-piperidone;
1-methoxy-2,2,6,6-tetramethyl-4-piperidone,
1-ethoxy-2,2,6,6-tetraethyl-4-piperidone,
1-propoxy-2,2,6,6-tetramethyl-4-piperidone;
1-oxy-2,2,6,6-tetramethyl-4-piperidone or
1-oxy-2,2,6,6-tetraethyl-4-piperidone.

In effecting the reductive alkylation reaction of the phenylamines represented by Formula III above with the piperidones represented by Formula IV above to prepare the compounds of this invention, the conditions and procedures used may be widely varied. Generally, the conditions and procedures commonly employed in reduction alkylations of nitro or amino substituted phenylamines with ketones to prepare N-mono or N,N'-di-substituted phenylenediamines may be satisfactorily used for the preparation of the compounds of this invention. Typically, the reductive alkylation reaction is effected in one step in the presence of hydrogen and reduction catalysts and, if desired, solvents such as aliphatics. Suitable catalysts for this purpose include such catalysts as Raney nickel, palladium, platinum, platinum oxide, nickel-platinum, copper or molybdenum as well as mixtures thereof. Such catalysts may be used with or without a support and such supports include such materials as charcoal, alumina, silica or mixtures thereof. An elevated temperature is used which generally ranges from about 90° to 300° C. using elevated hydrogen pressure ranging from about 50 to 3000 pounds per square inch. Alternatively, if desired, the reductive alkylation may be effected in more than one step. For example, the formation of the initial Schiffs base may be first effected by condensing the desired amino or nitro phenylamine with the desired piperidone in the presence of a solvent such as xylene at atmospheric refluxing temperature. The Schiffs base thus prepared may then be reduced in the presence of hydrogen according to the above procedure at elevated temperature and pressure to obtain the desired product. Examples of the compounds of this invention which may be prepared in the reductive alkylation include N-(2,2,6,6-tetramethyl-piperidyl-4)-p-phenylenediamine,
N-(2,2,6,6-tetraethyl-piperidyl-4)-o-phenylenediamine,
N-(1-methyl-2,2,6,6-tetramethylpiperidyl-4)-p-phenylenediamine,
N-(1-hydroxy-2,2,6,6-tetramethylpiperidyl-4)-p-phenylenediamine,
N-(1-methoxy-2,2,6,6-tetramethylpiperidyl-4)-p-phenylenediamine,
N-(1-oxy-2,2,6,6-tetramethylpiperidyl-4)-p-phenylenediamine;
N-(2,2,6,6-tetramethylpiperidyl-4)-N'-nonyl-p-phenylenediamine,
N-(1-ethyl-2,2,6,6-tetramethylpiperidyl-4)-N'-octyl-p-phenylenediamine,
N-(1-hydroxy-2,2,6,6-tetramethylpiperidyl-4)-N'-dodecyl-p-phenylenediamine,
N-(1-ethoxy-2,2,6,6-tetramethylpiperidyl-4)-N'-butyl-p-phenylenediamine,
N-(1-oxy-2,2,6,6-tetramethylpiperidyl-4)-N'-octyl-p-phenylenediamine,
N-(2,2,6,6-tetramethylpiperidyl-4)-N'-cyclohexyl-p-phenylenediamine,
N-(1-methyl-2,2,6,6-tetramethylpiperidyl-4)-N'-cyclopentyl-p-phenylenediamine,
N-(2,2,6,6-tetramethylpiperidyl-4)-N'-phenyl-p-phenylenediamine,
N-(1-methyl-2,2,6,6-tetramethylpiperidyl-4)-N'-phenyl-p-phenylenediamine,
N-(1-hydroxy-2,2,6,6-tetramethylpiperidyl-4)-N'-phenyl-p-phenylenediamine,
N-(1-methoxy-2,2,6,6-tetramethylpiperidyl-4)-N'-phenyl-p-phenylenediamine,
N-(1-oxy-2,2,6,6-tetramethylpiperidyl-4)-N'-phenyl-p-phenylenediamine,
N-(2,2,6,6-tetramethylpiperidyl-4)-N'-naphthyl-p-phenylenediamine;
N,N'-di-(2,2,6,6-tetramethylpiperidyl-4)-p-phenylenediamine,
N,N'-di-(1-methoxy-2,2,6,6-tetramethylpiperidyl-4)-p-phenylenediamine,
N,N'-di-(1-hydroxy-2,2,6,6-tetramethylpiperidyl-4)-p-phenylenediamine,
N,N'-di-(1-oxy-2,2,6,6-tetramethylpiperidyl-4)-p-phenylenediamine;
N-(2,2,6,6-tetramethylpiperidyl-4)-N'-(1-methyl-2,2,6,6-tetramethylpiperidyl-4)-p-phenylenediamine,
N-(1-hydroxy-2,2,6,6-tetramethylpiperidyl-4)-N'-(1-methoxy-2,2,6,6-tetramethylpiperidyl-4)-p-phenylenediamine or
N-(1-oxy-2,2,6,6-tetramethylpiperidyl-4)-N'-(2,2,6,6-tetramethylpiperidyl-4)-p-phenylenediamine.

As hereinbefore indicated, the novel compounds of this invention are particularly useful in stabilizing compositions against the deteriorating effects of oxygen or ozone. The compositions which may be stabilized according to this invention by incorporation of the compounds of this invention therein, in general, comprise any material which is deleteriously affected by the action of either ozone or oxygen. Examples of these compositions include petroleum products, for example, unsaturated gasolines or lubricating oils; edible fats and oils, for example, linseed oil or lard; polyolefins, for example, polyethylene or polypropylene; olefin copolymers, for example, ethylene and propylene; rubbery polymers including both natural rubber and synthetic rubbers, for example, homopolymers or copolymers of butadiene, isoprene, and similar aliphatic conjugated diolefin hydrocarbons, such as butadiene-styrene copolymer rubber, butadiene-acrylonitrile copolymer rubber, butadiene-vinylpyridine copolymer rubber, isobutylene-isoprene copolymer rubber, ethylene-propylene-conjugated diolefin or non-conjugated diolefin terpolymer or polychloroprene.

The compounds of this invention may be added to the above illustrated class of compositions, either individually or in admixture, according to any of the standard procedures commonly used for incorporating antiozonants or antioxidants into polymeric materials. These compositions may also, if desired, contain additional conventional antioxidants or antiozonants which, in combination with the compounds of this invention, may result in the formation of synergistic compositions. The amount of the compounds of this invention added to stabilize the compositions may be widely varied with the particular amount added being dependent upon such factors as the particular composition being stabilized, the particular stabilizing compound or compounds being added and whether the composition is being stabilized against oxidation or ozonolysis or both. For example, in the instance where rubbery polymers are being stabilized, the amount of the compound added usually ranges from about 0.05 to 10 weight parts per 100 weight parts of the rubbery polymer, with from about 0.1 to 5 weight parts per 100 weight parts usually being preferred.

The following examples are cited to illustrate the novel compounds of this invention and the preparational process therefor. They are not, however, intended to limit the broad scope of this invention to the specific compounds and preparational procedures illustrated therein.

3,480,635

EXAMPLE I

N-phenyl-N'-(2,2,6,6 - tetramethylpiperidyl - 4)-p-phenylenediamine was prepared according to the process of this invention according to the following procedure: The initial condensation step of the reductive alkylation was effected by charging about 9.3 grams (0.06 mol) of 2,2,6,6-tetramethyl-4-piperidone and 11 grams (0.06 mol) of p-aminodiphenylamine and 15 milliliters of xylene to a reaction flask equipped with an overhead condenser and water trap. With stirring, the mixture was heated to reflux (138° C.) and maintained thereat for about 36 hours during which time about 92 percent of the theoretical amount of water formed in the condensation had been collected. The xylene solvent was then removed and the remaining reaction mixture was charged to an autoclave containing a 5 percent palladium on charcoal catalyst. The autoclave was charged with hydrogen to a pressure of about 450 pounds per square inch and heated to about 100° C. The hydrogenation was continued until the theoretical amount of hydrogen had been adsorbed, a period requiring about 6 hours. The hydrogenation product was separated from the catalyst and chromatographed on basic alumina to recover 11 grams of a liquid product. Analyses by gas-liquid chromatography and infrared spectroscopy as well as elemental analysis indicated the desired structure.

EXAMPLE II

N,N'-di-(2,2,6,6-tetramethylpiperidyl-4)-p - phenylenediamine was prepared according to the general procedure of Example I by reacting 2,2,6,6-tetramethyl-4-piperidone in excess with p-phenylenediamine. The light-pink colored solid product had a melting point of 167° to 169° C. and analyses by gas-liquid chromatography and infrared spectroscopy as well as elemental analysis indicated the desired structure.

EXAMPLE III

N-(2,4 - dimethylheptyl-4) - N' - (2,2,6,6 - tetramethylpiperidyl-4)-p-phenylenediamine was prepared according to the general procedure of Example I by reacting 2,2,6,6-tetramethyl-4-piperidone with N-(2,4-dimethylheptyl-4)-p-phenylenediamine. The liquid product was obtained by column chromatography on basic alumina and analysis by infrared spectroscopy as well as elemental analysis indicated the desired structure.

EXAMPLE IV

Certain compounds of this invention were evaluated as antioxidant additives as follows:

A natural rubber tread stock of the recipe:

| Ingredient: | Parts by weight |
|---|---|
| Smoked sheet | 100.00 |
| Statex R | 45.00 |
| Zinc oxide | 5.10 |
| Stearic acid | 3.00 |
| Sulfur | 2.50 |
| Santocure | 0.75 |
| Antioxidant | As indicated | was cured for 40 minutes at 140° C. The cured rubber was then cut into test strips and aged for 1, 2, 4 and 7 day periods at 90° C. The strips were then subjected to the following tests, together with blank samples containing no antioxidant, as well as samples containing a standard antioxidant. The results of these tests are reported in Table I below. The compounds tested, the concentrations and code numbers for Table I are as follows:

| Compound | Code Number | Concentrations per 100 parts of rubber |
|---|---|---|
| -phenyl-N'-(2,2,6,6-tetramethylpiperidyl-4)-p-phenylenediamine. | 1 | 3.00 |
| N,N'-(2,2,6,6-tetramethylpiperidyl-4)-p-phenylenediamine. | 2 | 3.00 |
| N,N'-di-(1-methylheptyl)-p-phenylenediamine (standard additive). | 3 | 3.00 |

TABLE I

| Sample | Shore A Hardness Days aged | | | | Ultimate Elongation, Percent Days aged | | | | 200% Modulus, p.s.i. Days aged | | | | 300% Modulus, p.s.i. Days aged | | | | Tensile Strength, p.s.i. Days aged | | | |
|---|---|---|---|---|---|---|---|---|---|---|---|---|---|---|---|---|---|---|---|---|
| | 0 | 1 | 2 | 4 | 7 | 0 | 1 | 2 | 4 | 7 | 0 | 1 | 2 | 4 | 7 | 0 | 1 | 2 | 4 | 7 |
| Blank | 65.0 | 64.0 | 64.0 | 64.5 | 67.0 | 495 | 325 | 375 | 210 | 95 | 1,090 | 1,445 | 1,315 | 990 | ---- | 2,035 | 2,350 | ---- | ---- | 350 | 3,740 | 2,620 | 1,885 | 990 |
| #1 | 67.0 | 71.0 | 72.0 | 76.0 | 76.0 | 505 | 425 | 415 | 395 | 345 | 1,115 | 1,455 | 1,505 | 1,795 | 1,835 | 1,925 | 2,485 | 2,575 | 2,710 | 2,135 | 3,660 | 3,790 | 3,655 | 3,415 | 3,110 |
| #2 | 70.0 | 72.0 | 74.0 | 75.5 | 73.0 | 505 | 420 | 425 | 375 | 345 | 1,050 | 1,490 | 1,505 | 1,700 | 1,620 | 1,825 | 2,500 | 2,500 | 2,755 | 2,505 | 3,865 | 3,625 | 3,655 | 3,310 | 2,910 |
| #3 | 65.0 | 69.0 | 70.0 | 70.0 | 71.0 | 515 | 440 | 420 | 365 | 305 | 1,015 | 1,335 | 1,465 | 1,530 | 1,575 | 1,860 | 2,375 | 2,430 | 2,550 | 2,550 | 3,660 | 3,705 | 3,505 | 3,135 | 2,610 |

EXAMPLE V

Certain compounds of this invention were evaluated as antiozonant additives as follows:

An SBR sidewall stock rubber of the recipe:

| Ingredient: | Parts by weight |
|---|---|
| SBR 1502 | 100.00 |
| Furnex | 10.00 |
| Statex M | 30.00 |
| Zinc oxide | 3.00 |
| Stearic acid | 2.00 |
| Sulfur | 2.00 |
| Santocure | 1.25 |
| Additive | As indicated | was cured for 40 minutes at 140° C. and then cut into test strips of 1 inch by 4 inches. Different series of the test strips were then elongated 10%, 15% and 20% respectively, and the elongated strips were mounted on panels. The panels were placed in an ozone cabinet and subjected to an atmosphere containing 50 parts of ozone per 100 million parts of air at 10° F. and the time to first crack is noted. The results of these evaluations as compared to the results obtained for control samples containing no antiozonant additive and samples containing a standard antiozonant are reported below in Table II. The code numbers used for the antiozonants reported in Table II, the amount of the antiozonant compound used in the rubber samples, and the amount used in combination with a standard antiozonant are as follows:

| Sample Code No. | Antiozonant Additive | Concentration per 100 Parts of Rubber |
|---|---|---|
| 1 | N-phenyl-N'-(2,2,6,6-tetramethylpiperidyl-4) p-phenylenediamine. | 3.00 |
| 2 | do | 3.00 |
| 3 | N,N'-di-(1-methylheptyl)-p-phenylenediamine (Standard Additive). | 3.00 |
| 4 | do | 1.50 |
| 5 | N-phenyl-N'-(2,2,6,6-tetramethyl-piperidyl-4) p-phenylenediamine and Standard Additive as in Samples 3 and 4. | 1.50 |
| 6 | do | 1.50 |
| 7 | Blank, no additive | 1.50 |

TABLE II
[Static Testing, Hours to First Crack]

| | Elongation Percent | | | |
|---|---|---|---|---|
| | 10 | 15 | 20 | 30 |
| Sample: | | | | |
| 1 | >168 | | >168 | 4-6 |
| 2 | >168 | 1-2 | 0-1 | 0-1 |
| 3 | >168 | >168 | >168 | >168 |
| 4 | >168 | 8-24 | 4-6 | 2-4 |
| 5 | >168 | >168 | >168 | >168 |
| 6 | >168 | >168 | 75-80 | 8-24 |
| 7 | 0-1 | 0-1 | 0-1 | 0-1 |

As indicated by the data in Table II, the results for Samples 1 and 2 containing compounds of this invention, as compared to the results for Sample 7 containing no additive, indicate the positive antiozonant activity of these compounds. Not only, however, do these compounds have antiozonant activity, but the compound in Sample 1, namely, N-phenyl-N' - (2,2,6,6-tetramethylpiperidyl-4)-p-phenylenediamine has activity almost comparable to the standard antiozonant contained in Sample 3 when used in similar concentrations. Also of considerable significance is that certain compounds of this invention form synergistic mixtures were combined with the standard antiozonant. Compare, for example, the results for Samples 1 and 4 versus Sample 5, and Samples 2 and 4 versus Sample 6 where the combination of the different additives achieve results greater than the sum of the results when the additives are used separately.

I claim as my invention:

1. A compound of the formula:

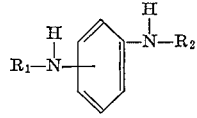

where $R_1$ is a piperidyl radical of the formula:

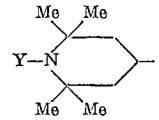

where Y is selected from the group consisting of hydrogen, hydroxy, alkoxy of from 1 to about 5 carbon atoms, lower alkyl of from 1 to about 5 carbon atoms, and oxy, and $R_2$ is selected from the group consisting of $R_1$, hydrogen, alkyl of from 1 to about 20 carbon atoms, cycloalkyl of from 5 to about 7 carbon atoms in the ring, phenyl and naphthyl.

2. The compound according to claim 1 characterized in that $R_1$ is a piperidyl radical where Y is hydrogen.

3. The compound according to claim 1 characterized in that $R_2$ is $R_1$.

4. The compound according to claim 1 characterized in that $R_2$ is alkyl of from 1 to about 20 carbon atoms.

5. The compound according to claim 1 characterized in that $R_2$ is cycloalkyl of from 5 to about 7 carbon atoms.

6. A compound according to claim 1 characterized in that $R_2$ is phenyl or naphthyl.

7. A compound according to claim 1 in which Y is hydrogen, and $R_2$ is a radical selected from the group consisting of $R_1$, 2,4-dimethylheptyl and phenyl.

References Cited

FOREIGN PATENTS 1,211,691 3/1960 France.
755,667 8/1956 Great Britain.

OTHER REFERENCES

Joseph et al.: J. Org. Chem. 24, 1371-2 (1959).

HENRY R. JILES, Primary Examiner

G. T. TODD, Assistant Examiner

U.S. Cl. X.R.

44—63; 99—163; 252—50, 401; 260—45.8, 294.7